Inventors
JOSEPH L. LINDINGER &
YEHUDA RACHOVITSKY
Carl V. Olson
Attorney

Nov. 5, 1968 J. L. LINDINGER ET AL 3,409,878

CONTROLLING INTERCHANGES BETWEEN A COMPUTER AND MANY COMMUNICATIONS LINES

Filed March 18, 1966 3 Sheets-Sheet 2

Inventors
JOSEPH L. LINDINGER &
YEHUDA RACHOVITSKY
Carl V. Olson
Attorney

Inventors
JOSEPH L. LINDINGER &
YEHUDA RACHOVITSKY
Carl V. Olson
Attorney

United States Patent Office 3,409,878

Patented Nov. 5, 1968

3,409,878

CONTROLLING INTERCHANGES BETWEEN A COMPUTER AND MANY COMMUNICATIONS LINES

Joseph L. Lindinger and Yehuda Rachovitsky, Philadelphia, Pa., assignors to Radio Corporation of America, a corporation of Delaware Filed Mar. 18, 1966, Ser. No. 535,586
4 Claims. (Cl. 340—172.5)

ABSTRACT OF THE DISCLOSURE

A communications control unit, which is itself a small computer, for use between a main computer and many diverse bit-serial communication line buffers. The communications control unit includes a communications reporting logic unit for sending message-protection reports from the communications control unit to the main computer. The occurrence of a message protection control character in the data path of the communications control unit causes accessing of an operation word for the performance of message-protection procedures. If the procedure requires action by the main computer, a communications reporting byte is generated and sent to the main computer to inform it of the complex communications control situation existing. The report is sent to the main computer over the standard interface trunk without the need for additional non-standard connecting lines.

Figure 1:
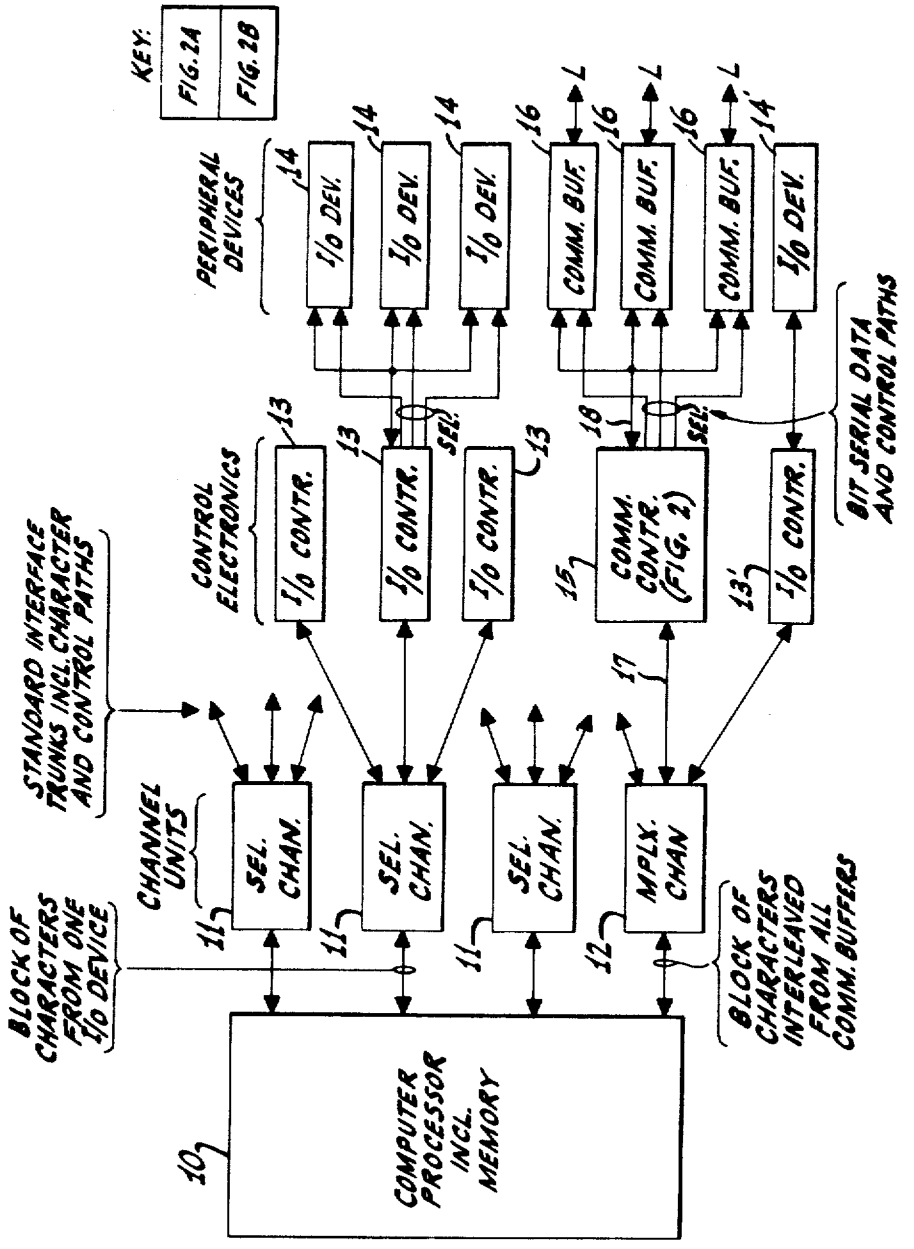

This invention relates to means for controlling interchanges of information between a high-speed general-purpose computer and a plurality of diverse slow-speed, bit-serial, digital communications line buffers.

GENERAL

Existing and proposed digital communications systems differ greatly in speed of operation, method of synchronization, number of bits per character, type of error-checking parity, and use of message-protection procedures. It is possible to program a general-purpose computer to interchange information with a number of such real-time communications lines, but the awesome number of detailed steps which the computer must perform wastefully use up the computer's capabilities and leave it no time for the performance of other tasks. It is also possible to build and program a special-purpose computer to efficiently control the interchange of information with many communications lines. However, such a special-purpose computer may not be suitable for handling changing communications needs of the user, and will not be suitable for the performance of other tasks for the user. Computers are more and more frequently being used to control an entire organizational system in which communications with many geographical points is a vital integral part of the overall task assigned to the computer.

OBJECTS

It is therefore a general object of this invention to provide an efficient and adaptable communications control unit for use in combination with a general-purpose computer to control the interchange of information between the general-purpose computer processor and a plurality of diverse communications line buffers.

It is another object to provide a communications control unit which couples information from communications line buffers to the computer through a standard interface trunk similar to trunks used for all other peripheral devices.

It is another object to provide an improved communications control unit which, after being initialized by a program in the computer processor, relieves the computer processor of numerous channel-coordination message-protection functions by itself sensing and dealing with communications control characters appearing in its main data path.

It is another object to provide an improved communications control unit which recognizes all of the communications control characters used by different communications systems, which recognizes the classification of the communications system sending or receiving the control character, and which accesses one of relatively few thereby-determined operation control words and performs an indicated channel-coordination function.

It is another object to provide an improved communications control unit capable of effecting a transfer over the data lines to the computer processor of message protection procedure information.

DESCRIPTION

In accordance with an example of the invention, there is provided a communications control unit for controlling the interchange of data characters and control characters between a character-handling computer processor and many line buffers of a large number of respective real-time on-line bit-serial communications systems ranging in classification from simple uncontrolled teletype systems to systems utilizing control characters and procedures to provide a high degree of message protection. A random-access memory stores as many line status words as there are communications lines, each line status word including a bit-accumulation-and-distribution portion, a character portion, a system-class portion, and a status-and-control portion.

The random-access memory also stores as many operation words as there are different sets of communications control functions to be performed in response to control characters associated with the many communications systems. A line scanner means sequentially accesses the line status words in the memory and enables communication with a respective line buffer or with the computer processor. A logic unit is operative to sense the character, the bit-accumulation-and-distribution and the system-class portions of an accessed line status word and to condition conductive paths for accomplishment of synchronization and modification of bit-per-character and parity coding, to transfer a bit between the bit-accumulation-and-distribution portion and the respective communications line buffer, to transfer a character between the bit-accumulation-and-distribution portion and the character portion, and to transfer a character between the character portion and the computer processor.

The character and system-class portions of an accessed line status word are sensed for the presence of a communications control character and the designation of a system class utilizing the communications control character, and a particular corresponding operation word in the memory is accessed. A decoder decodes the accessed operation word and conditions conductive paths for the performance of the channel-coordination message-protection functions required by the particular control character when present in a system of the particular communications system class.

A decoder output is connected to a communications reporting logic unit and is energized if the accessed operation word calls for a transfer of message protection procedure information to the computer processor. The communications reporting logic unit controls the transfer over the data line to the processor of its own distinctive communications reporting address, the address of the accessed line status word and portions of the accessed line status word and the accessed operation word.

Figure 2A:
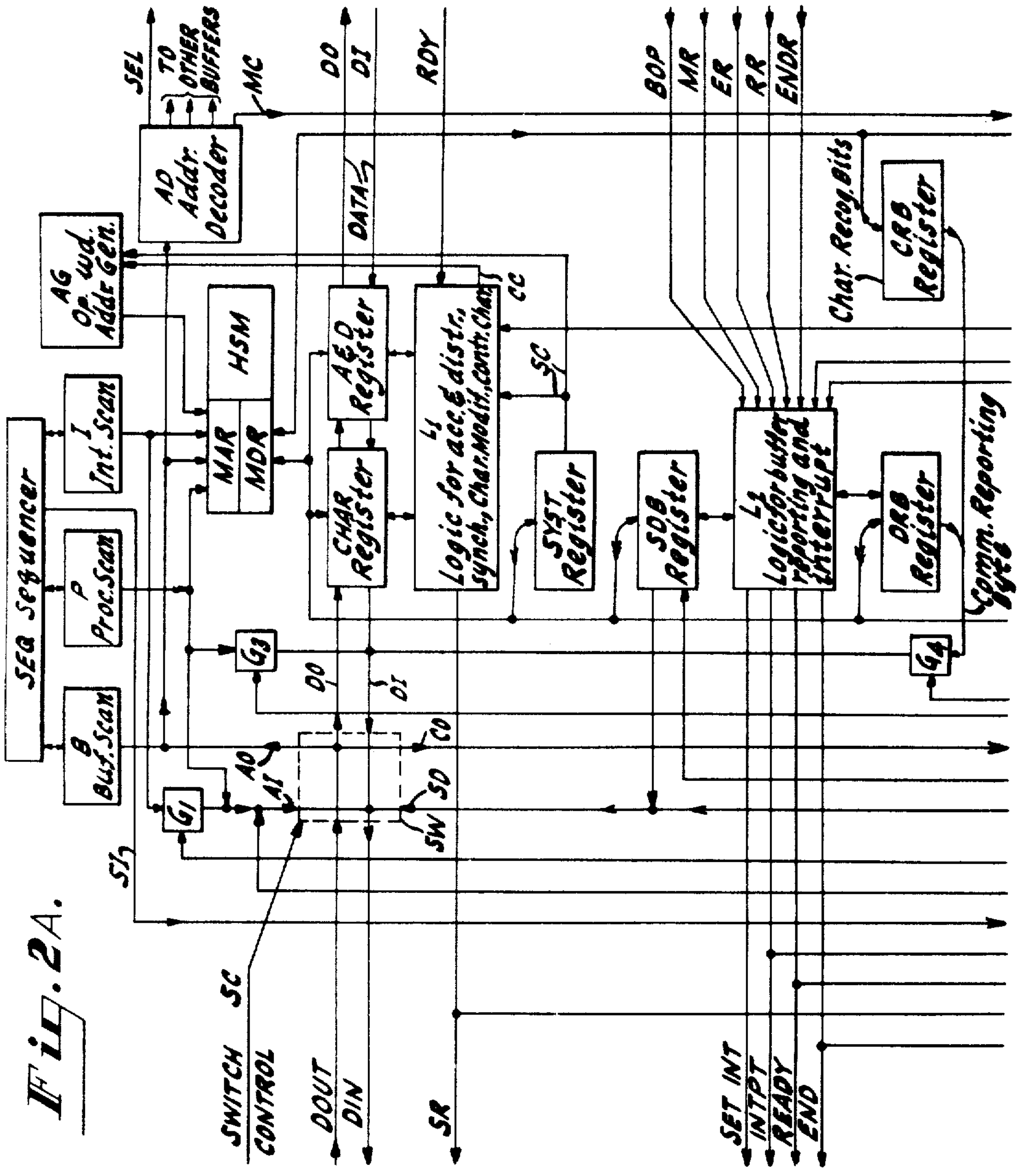
Figure 2B:
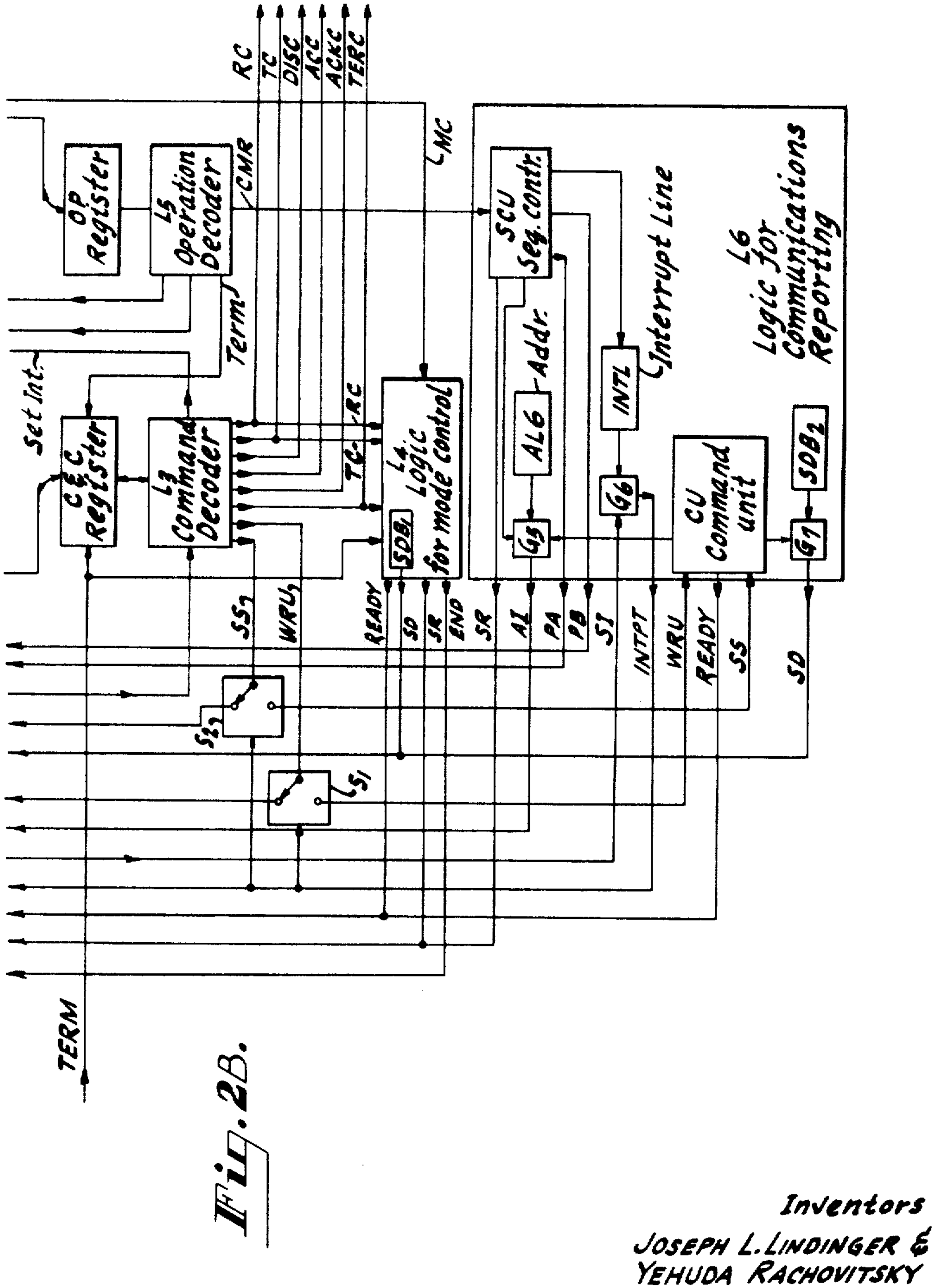

In the drawing:

FIG. 1 is a system block diagram of a computer processor and peripherals including a commnuications control unit; and FIGS. 2A and 2B taken together is a block diagram of a communications control unit, according to the teachings of the invention, for use in the system of FIG. 1.

*Description of FIG. 1*

Reference is now made in greater detail to FIG. 1 which shows a complete computer system. A general purpose computer processor 10 includes a memory and logic for the performance of stored programs. The computer processor 10 is intimately associated with a plurality of selector channels 11 and a multiplex channel 12. Each selector channel 11 couples the processor 10 with a plurality of input-output control units 13, and each input-output control unit 13 is coupled with a plurality of input-output devices 14. The input-output devices 14 include such devices as magnetic tape stations, magnetic drums, printers, card punchers and readers, and tape punchers and readers. The multiplex channel 12 couples the processor 10 with a communications channel unit 15, which in turn is coupled with a plurality of communications buffers 16 associated with respective communications lines L. One or more local input-output device 14' may also be served by the multiplex channel 12 through an input-output control unit 13'.

The communications buffers 16 receive and transmit digital information bits at a rate which is generally slow compared with the operating rates of the input-output devices 14. The coupling between each selector channel 11 and the processor 10 is used for the transfer of a block of characters associated with one input-output device 14 at a time. The coupling between the multiplex channel 12 and the processor 10 is used for the transfer of a block of characters associated with all communications buffers 16 and input-output devices 14' at a time. The characters associated with the many buffers 16 and devices 14' are serially interleaved in the block of characters coupled between the multiplex channel 12 and the computer processor 10.

The couplings between the selector channels 11 and the input-output control units 13, and the couplings between the multiplex channel 12 and the communications control unit 15 and control units 13' are all standard interface trunks each including a multi-conductor data output bus, a multi-conductor data input bus and several control signal conductors. The use of standard interface trunks permits a complete computer system to be assembled including any reasonable number of input-output control units 13 and associated input-output devices 14, and optionally including a multiplex channel 12 coupled to a number of input-output devices.

In the system configuration illustrated, one of the standard interface trunks 17 of the multiplex channel 12 couples the multiplex channel 12 with a communications control unit 15.

The communications control unit 15 is designed to accumulate and distribute data bits from and to the many communications buffers 16 in time sequence. The communications control unit 15 performs control functions appropriate to the respective communications line systems and provides for the interchange of data characters with the processor 10 through a standard interface trunk 17 and the mutliplex channel 12. The interposed communications control unit 15 thus makes it possible for the computer processor 10 to efficiently deal with the many communications line buffers 16 in substantially the same way it deals with the input-output devices 14.

*Description of FIGS. 2A and 2B*

Reference is now made to FIGS. 2A and 2B for a description of the architecture of a communications control unit suitable for use in the box 15 of the complete computer system shown in FIG. 1. The standard interface trunk 17 of FIG. 1 is shown in FIGS. 2A and 2B as including a multi-conductor data character output line DOUT, a multi-conductor data character input line DIN, a multi-conductor switch control line SC, a service request line SR, a set interrupt line SET INT., an interrupt line INTPT, a ready line READY, an end line END, and a terminate line TERM.

The output bus 18 shown in FIG. 1 from the communications control unit 15 to the many buffers 16 is shown in FIGS. 2A and 2B to include a data bit output line DO, a data bit input line DI, and several buffer reporting and control lines. The buffer reporting lines include a buffer ready line RDY, a buffer operable line BOP, a malfunction report line MR, an error report line ER, a ringing report line RR, and an end of buffer termination action line ENDR. The buffer control lines include a receive command line RC, a transmit command line TC, a disconnect command line DISC, an auto-call command line ACC and a termination command line TERC. The foregoing lines are all connected through a bus to all of the communications buffers 16. The reporting and control signals may be conveyed by fewer physical conductors by employing coders and decoders in the control unit 15 and the buffers 16. Each communications buffer 16 is also connected by a respective individual selection line SEL. When the selection line connected to one selected buffer is energized, solely the selected buffer is connected through the above-listed lines of the common bus to the communications control unit of FIGS. 2A and 2B.

The elemental units of the communications control unit of FIGS. 2A and 2B may be constructed in accordance with standard, conventional computer design practices by persons skilled in the art for use in the architectural scheme constituting the present invention.

*Description of line status words*

The communications control unit includes a random-access high-speed memory HSM having a memory address register MAR and a memory data register MDR. The high speed memory HSM is used for the storage of as many line status words as there are communications line buffers 16 connected to the communications control unit 15. The memory HSM is also used for the storage of as many operation words as there are different sets of control functions to be performed in response to control characters received from or sent to the many diverse communications systems of the many communications lines.

The line status words in memory HSM are sequentially accessed by means of a buffer scan unit B, a processor scan unit P and an interrupt scan unit I. Each scan unit includes a counter for sequentially addressing all of the line status words using addresses assigned to the respective buffers. A sequencer SEQ controls the scan units to provide two successive cycles of the B scan unit, followed by one cycle of the P scan unit, in turn followed by one cycle of the I scan unit. Every time the buffer scan unit B supplies a buffer address to the memory address register MAR of the memory HSM, it also supplies the address to an address decoder AD which energizes the one of its output lines SEL which is connected to the buffer having the corresponding address.

When a scan unit supplies the address of a line status word to the memory address register MAR, the addressed line status word in the memory is transferred through the memory data register MDR to a number of registers each accommodating a particular portion of the line status word. The registers connected to receive respective portions of the line status word are a character register CHAR, a bi-accumulation-and-distribution register A&D, a system-class register SYST, a standard-device-byte register SDB, a device-recording-bits register DRB and a command-and-control register C&C. The registers SDB, DRB and C&C may be viewed as status-and-control registers for a status-and-control portion of the line status word.

The system-class register SYST includes space for the storage of bits indicating that the communications system is asynchronous or synchronous, uses 4-, 5-, 6-, 7-, 8-, or 9-bits-per-character, uses (if asynchronous) one, two or three stop bits for synchronizing, uses (if synchronous) a specified code, uses no parity, even parity or odd parity, and (by modifier bits) is any one of a number of specific different communications systems.

A first logic until $L_1$ is coupled with the character register CHAR and the accumulation-and-distribution register A&D for the purpose of sensing the contents of the registers and performing synchronization functions and character-modification functions appropriate to a communications system defined by the contents of system-class register SYST. The character modification functions include modification of the number of digital bits per character and modification of the parity bit scheme, as required in dealing with various communications systems codes. The logic unit $L_1$ also includes means for sensing the presence of a communications control character in the register CHAR.

The standard-device byte register SDB includes space for storing status and historical information such as a status modifier condition, a buffer inoperable condition, an illegal operation status, a channel-end termination condition, a buffer-end termination condition, a condition in which the control unit is busy executing a command, a condition in which the buffer is busy executing a command, a termination interrupt pending condition due to receipt of a "set termination interrupt" command from the computer processor, and a manual request condition.

The device-reporting bits register DRB provides space for storing additional status and historical information peculiar to protected communications systems, including good block parity, bad block parity, buffer malfunction report, buffer error report, buffer ring report, open line, break, time out, pause and multiplex service error.

A second logic unit $L_2$ is connected with the standard-device-byte register SDB and the device-reporting-bits register DRB. The logic unit $L_2$ is also connected by indicated control lines extending on one side through the standard interface trunk and extending on the other side to the buffers. The logic unit $L_2$ is constructed to respond to various control and reporting signals and to maintain a record of the operational status of a buffer in the registers SDB and DRB.

The command-and-control register C&C includes space for storing commands received from the computer processor. The commands may include: read, write, write control, send status, who are you?, set termination interrupt, no operation, and read reverse.

A command decoder $L_3$ is connected with the command-and-control register C&C for the purpose of decoding commands present in the register and supplying control signals to various points in the communications control unit and through control lines to the buffers.

A mode control logic unit $L_4$ operates in response to signals from the command decoder $L_3$ to condition the communications control unit for the initial loading of its memory HSM by the computer processor 10, for initiating normal mode operation with the scanners functioning, for an idle mode condition, and for unloading the memory HSM back to the computer processor.

*Description of operation word*

As has been stated, the logic unit $L_1$ includes means for recognizing the presence of a communications control character in the character register CHAR. A distinctive manifestation of the recognized control character is transmitted by the logic unit $L_1$ over line CC to an operation word address generator AG. Simultaneously, a manifestation of the system classification contained in register SYST is transmitted over line SC to the operation word address generator AG. These two inputs to the address generator AG cause it to generate the address in memory HSM of an operation word which contains information regarding the procedures to be followed when the particular communications control character appears on its way to or from the buffer of a communications system falling within the particular system classification recorded in the system-class register SYST.

The accessed operation word is transferred from the memory data register MDR of the memory HSM to operation word registers, a portion of the operation word going to a character-recognition-bits register CRB and the balance of the operation word going to an operation register OP. A logic unit $L_5$ contains an operation decoder and logic for controlling the performance of synchronizing and message-protection functions dictated by the presence in the character register CHAR of a control character passing from or to a communications system falling within a classification indicated by the contents of the system-class register SYST.

The portion of the operation word contained in operation register OP may include bits indicating that a special communications reporting message must be transmitted over the data input line DIN to the computer processor. If a communications reporting message is required, the decoder in logic unit $L_5$ directs a signal over line CMR to a communications reporting logic unit $L_6$. The logic unit $L_6$ is assigned an unused buffer address which is not included in the buffer addresses sequentially generated by the scan units B, P and I. A distinctive address is assigned to the communications reporting logic $L_6$ so that control information concerning procedures required on highly-protected communications lines can be conveyed to the computer processor through the standard interface trunk 17 without adding a large number of nonstandard control lines to the trunk.

The communications reporting logic unit $L_6$ includes a sequence control unit SCU which responds to a received signal on line CMR to control sequential operations within the logic unit $L_6$. A "service request" output SR of the sequence control unit SCU is connected to the computer processor. The address assigned to the communications reporting logic unit $L_6$ is retained in an address unit $AL_6$, from which it can be supplied through a gate $G_5$ to the computer processor. An output PA of sequence control unit SCU enables a gate $G_3$ to pass the address of the buffer being reported on from the processor scan unit P to the computer processor. An output PB from the sequence control unit SCU enables a gate $G_4$ to pass a communications reporting byte from registers DRB and CRB to the computer processor. An interrupt line INTL is set by an output of the sequence control unit SCU. The "set" state of the interrupt line INTL is conveyed to the computer processor through a gate $G_6$ when the gate is enabled by a "sense interrupt" signal over line SI from sequencer SEQ. The communications reporting logic unit $L_6$ also includes a standard-device-byte register $SDB_2$ for containing information concerning the status of the logic unit $L_6$. A command unit CU has an output line READY for sending a "ready" signal to the computer processor. The command unit CU has an output to enable gate $G_5$ when it receives a "who are you?" signal over line WRU from the computer processor, and has an output to enable gate $G_7$ when it receives a "send status" signal over line SS from the processor.

The communications reporting logic unit $L_6$ controls the transfer to the computer processor over data input line DIN of its own peculiar address, followed by the address of the buffer being reported on, in turn followed by a communications reporting byte consisting of the contents of the device-reporting bits register DRB and the contents of the character-recognition bits register CRB.

The computer processor 10 (FIG. 1) has places in its memory for storing information received from all of the buffers and a place for storing communications reporting messages received from the communications reporting logic $L_6$. The program followed by the computer processor includes provisions for frequently examining information stored in the memory location reserved for communications reporting messages to determine the presence of a communications message, to determine the buffer and communications line reported on, and to determine the particular communications reporting byte stored. The program followed by the computer processor includes routines and subroutines designed to accomplish whatever complex channel-coordination and message-protection functions it may be required to perform.

OPERATION

The operation of the communications control unit of FIGS. 2A and 2B will now be described starting with a description of how traffic on DOUT and DIN lines is controlled, how line status words and operation words are loaded into the memory HSM, and how the operation of the scanners is initiated.

*Control of traffic on DOUT and DIN lines*

The processor sends address characters, command characters and data characters to the communications control unit over the data output line DOUT. The destinations in the communications control unit of the various characters is determined by a switch SW operated under control of "switch control" signals from the processor over the line SC. When the processor sends an address over the line DOUT, it simultaneously sends a switch control signal over line SC to cause the switch SW to direct the address over its address output line AO. When the processor sends a command on the line DOUT, the switch SW directs the command along command output line CO. Finally, when the processor sends a data character (or a communications control character), the switch SW directs the character to the data output line DO.

The computer processor receives buffer addresses, standard device bytes, and data (including a communications reporting byte) over the line DIN from the communications control unit. The computer processor in the execution of its stored program determines the nature of the information it will receive on the line DIN by sending an appropriate switch control signal over the line SC to the switch SW. In this way, the switch SW determines the source of, and nature of, information transmitted from various points in the communications control unit to the computer processor. When an address is to be sent to the processor over the line DIN, the switch SW accepts an address over the address input line AI. When a standard device byte is to be sent to the processor, the switch SW accepts an input on the line SD. Finally, when a data character (or a communications reporting byte) is to be sent to the computer processor, the switch SW accepts an input on the data input line DI. The lines DOUT and DIN are each nine-conductor lines for transferring in parallel the bits of a complete character consisting of eight information bits and one parity bit.

*Initialization of communications control unit*

The communications control unit of FIGS. 2A and 2B is initialized by loading the memory HSM with line status words and operation words, and by then starting the operation of the scan units B, P and I. This is accomplished by directing the special peculiar address of the logic unit $L_6$ over the line DOUT through the switch SW to the address decoder AD. The energized output MC of the address decoder is directed to the mode control logic unit $L_4$. The logic unit $L_4$ then supplies a "ready" signal to the processor over the control line READY. The processor then enables switch SW to pass the standard device byte $SDB_1$ of the mode control logic unit $L_4$ over the line DIN to the processor. The processor responds by directing a "write" command over line DOUT to the command decoder $L_3$. The "transmit" output lead TC from decoder $L_3$ causes the mode control logic unit $L_4$ to condition paths for loading the memory HSM with words supplied by the processor. Thereafter, the mode control logic unit $L_4$ signals a request for service on the service request line SR every time it is ready to receive another character. The procedure continues until the memory HSM is completely loaded, at which time the mode control logic unit $L_4$ sends an "end" signal over control line END. The processor then directs a "read" command character over the line DOUT to the command decoder $L_3$. The output RC from decoder $L_3$ puts the communications control unit into operation with the scan units B, P and I running.

The sequencer SEQ controls the sequence of operation of the scanners allowing the scan unit B to go through two cycles of operation in successively delivering the addresses of two buffers, followed by one cycle of the P scan unit, in turn followed by one cycle of the I scan unit.

Once set in operation, the scanners operate continuously under control of the sequencer SEQ. The amount of time spent on one access cycle of a scan unit depends on the time required to service the conditions existing. A new scan cycle is initiated as soon as the work required during the previous scan cycle has been completed.

*Activation of buffers*

Commands are issued by the computer processor requesting that buffers be set to receive information from their communications lines or be set to transmit information to their communications lines. The computer processor sends a buffer address over the line DOUT and through the switch SW to the memory address register MAR. The line status word associated with the addressed buffer is then transferred from memory HSM to the line status word registers including the standard-device-byte register SDB. The logic unit $L_2$ responds by sending a "ready" signal over control line READY to the processor, after which the processor conditions the switch SW for the transfer of the contents of the standard-device-byte register SDB over line DIN to the processor. Thereafter, the processor issues a "read" or a "write" command over the line DOUT and through the switch SW to the command decoder logic $L_3$. The command is not at this time acted upon, but rather is stored in the command-and-control register C&C. The contents of all of the line status word registers are then returned to their assigned location in the high speed memory HSM.

The computer processor then repeats the process using the address of another buffer, and so on until the commands for all the buffers have been stored in the corresponding line status words in memory HSM.

At some time determined by the operation of sequencer SEQ and the buffer scan unit B, the address of a buffer and a corresponding line status word storing a command for the buffer is directed from the buffer scan unit B to the memory address register MAR and the address decoder AD. This results in the accessing of the corresponding line status word and the energizing of the addressed buffer over its selection line SEL. The "read" or "write" command previously stored in the line status word is now present again in the command-and-control register C&C where it is decoded by command decoder logic unit $L_3$. Logic unit $L_3$ issues a "receive" command or a "transmit" command to the buffer over a respective command line RC or TC. The selected and commanded buffer then puts itself in condition to receive information from its communications line, or transmit information to its communications line. The process is repeated for the other buffers when they are addressed by the buffer scan unit B. The entire system is then in condition for the exchange of message information between the computer processor and the many buffers.

*Transfer of a character from computer processor*

Transfer of a message character from the computer processor to the communications control unit of FIGS. 2A and 2B is accomplished during the accessing by the processor scan unit P of a line status word corresponding with a particular buffer. The address from the scan unit P is directed to the memory address register MAR and results in the transfer of the corresponding line status word to the several registers. The character register CHAR is assumed to be empty and this fact is sensed by the logic $L_1$ which directs a service request to the processor over the control line SR. The processor then conditions the switch SW to receive the address of the accessed line status word from the processor scanner P and transfer the address to the processor through the data input line DIN. The processor knows from the received buffer address that the buffer is one which was previously commanded to transmit messages to its communications line. The computer processor then directs a data message character over data output line DOUT and conditions switch SW to direct the data character to the character register CHAR. Thereafter the contents of all the line status word registers are returned to their assigned locations in the memory HSM.

Subsequently, the same buffer address will be generated by the buffer scan unit B and supplied to the memory address register MAR and the address decoder AD. The address decoder AD directs a selection signal over line SEL to the addressed buffer to condition it for the receipt of a data bit and for the receipt and transmission of control signals. The character now again present in the character register CHAR is sensed by logic unit $L_1$ and is modified in number of bits and in parity if required under control of a signal over line SC from the system-class register SYST. The modified character is then transferred to the bit-accumulation-and-distribution register A&D. Thereafter, the buffer sends a "ready" signal over line RDY to the logic unit $L_1$. The logic unit responds by transferring one bit of the character in the bit-accumulation-and-distribution register A&D to the buffer over the data bit output line DO. The remaining contents of register A&D is returned with the rest of the line status word to memory HSM.

*Transfer of data from a buffer to the processor*

During the accessing by the buffer scan unit B of a line status word, and the selective energization of a corresponding buffer set to receive messages, the buffer will signal the communications control unit over the ready line RDY if it has a bit ready to supply. The ready signal is directed to the logic unit $L_1$ which conditions the bit-accumulation-and-distribution register A&D to receive the information bit from the buffer over data bit input line DI. The contents of the bit-accumulation-and-distribution register A&D, together with the contents of the other registers, is then returned to the line status word storage location in memory HSM.

The scan units continue accessing line status words under the control of the sequencer SEQ. When the buffer scan unit B again reaches and addresses the buffer which supplied one information bit as described above, the procedure is repeated for the transfer of a second information bit from the buffer. Successive accesses of the same buffer by the buffer scan unit B each result in the transfer of one additional information bit until a complete character of about nine bits is accumulated in the register A&D. When this occurs, the logic unit $L_1$ performs any necessary character and parity modifications, and effects the transfer of the modified character from the accumulation-and-distribution register A&D to the character register CHAR. The character in register CHAR is then returned with the contents of the other registers to the appropriate line status word location in memory HSM.

At a later time, when the processor scan unit P accesses the same line status word having a complete character, the logic unit $L_1$ senses the presence of the character in the register CHAR and issues a service request to the computer processor over line SR. The processor then controls switch SW to pass the address of the line status word and corresponding buffer from the processor scan unit P over the data input line DIN, and then conditions the switch SW to pass the character in register CHAR over the data input line DIN. The contents of the registers are then returned to the memory HSM to conclude the described procedure by which a complete character from one buffer is accumulated bit-by-bit and transferred to the computer processor.

*Data transfer termination by processor*

The above-described transfer of data between the computer processor and a buffer may continue until terminated by the processor. The processor program may, for example, provide for the transfer of a block of *n* message characters and provide on the occurrence of the *n*th character for the simultaneous transmission of a termination signal over the control line TERM. The transfer of a data character and the simultaneous transmission of a termination signal occur during the access of the line status word by the processor scan unit P. The termination signal from the processor is applied over line TERM to the command-and-control register C&C, from which it is returned with the remainder of the line status word to the memory HSM.

Subsequently, during the next access of the same line status word by the buffer scan unit B, the logic unit $L_3$ decodes the termination signal stored in the command-and-control register C&C and transmits a termination command signal over line TERC to the selected buffer. The buffer stores and executes the terminate command and thereafter responds when it is selected by the buffer scan unit B with an "end report" signal directed over line ENDR, through the logic line $L_2$ to the device-reporting-byte register DRB, from which it is returned with the rest of the line status work to the memory HSM. Then, during the next following access of the same line status word by processor scan unit P, the logic unit $L_2$ recognizes the "end" condition previously reported by the buffer and stored in register DRB and transmits an "end" signal over line END to the processor. At the same time, a service request signal is sent to the processor over line SR. The processor recognizes the "termination" and "service request" signals as indicating that the particular buffer is terminated and is in condition to receive a new command.

*Data transfer interruption by processor*

The execution of a program by the computer processor may reach a point where an interruption, as distinguished from a termination is needed to inform the processor regarding the progress made in transferring characters. For example, the point may be one where data blocking is done to efficiently utilize limited high speed memory space in the computer processor. The reaching of the end of a data block is recognized by the computer processor by the filling of the block of memory space in its memory. A "data chaining" feature of the processor automatically obtains a new block of memory space. The first character transfer to the new block of memory space may call for a notification to the processor of what has automatically transpired. This notification is initiated by a "set interrupt" signal over line SET INT through the logic unit $L_2$ to an "interrupt pending" location in the standard-device-byte register SDB. The processor scan cycle concludes with the transfer of the contents of the registers, including register SDB, to the appropriate line status word location in memory HSM.

At the end of each cycle of the processor scan unit P, the sequencer SEQ initiates one cycle of the interrupt scan unit I. The interrupt scan unit I, like the other scan units, has a counter for sequentially addressing all of the line status words, addressing one line status word during each cycle. When the interrupt scan unit I reaches and supplies the address of the line status word containing an "interrupt pending" indication, the logic unit $L_2$ recognizes the interrupt pending bit in the standard-device-byte register SDB and directs an interrupt signal to the processor over the control line INTPT. The processor, upon receipt of the interrupt signal, issues a command "Who are you?" over the data output line DOUT. The processor also sends a signal on switch control line SC to the switch SW which directs the command through the line CO to the command decoder and logic unit $L_3$. The logic unit $L_3$ recognizes the command and energizes its "who are you?" output line WRU. The WRU signal passes through a through a switch $S_1$ to enable a gate $G_1$ to pass the address of the accessed line status word from the interrupt scan unit I through the switch SW (simultaneously conditioned by a signal on switch control line SC) and through the data input line DIN to the processor.

At the same time, the logic unit $L_2$ signals the process over line READY that the standard device byte in register SDB is ready for transmission to the processor. This "ready" signal stimulates the computer processor to issue a "send status" command over data output line DOUT through switch SW to the command decoder and logic unit $L_3$. The "send status" output SS of unit $L_3$ passes through a switch $S_2$ (conditioned by a signal on switch control line SC) to the standard-device-byte-register SDB to cause its contents to be sent to the computer processor over data input line DIN. The logic unit $L_2$ then resets the "interrupt pending" bit in the register SDB. The processor, having received the address and status of the buffer which has been interrupted, then enters into an interrupt routine to appropriately deal with the interruption.

*Occurrence of a communications control character*

Communications systems having channel-coordination message-protection procedures employ communications control characters in addition to message data characters. The communications control characters may be synchronizing characters such as "idle line," or may be characters concerned with procedures described as: acknowledgement, negative acknowledgment, start of text, end of text, end of transmission block, end of transmission, attention, cancel data, repeat message, device controls, and start special sequence.

A control meaning may be represented by differently-coded control characters in different communications systems. It is therefore necessary to interpret a communications control character in terms of the communications system in which it occurs in order to determine its meaning. Communications systems differ greatly in the degree to which they protect messages against loss or error in transmission, and the systems differ greatly in the procedures followed in protecting messages. The protection procedures involve parity checking, acknowledgments of receipt and correctness of message characters, acknowledgments of receipt and correctness of message blocks, and procedures to follow in the event of an error.

When a control character appears in the character register CHAR during the access of a line status word of a particular buffer by the processor scan unit P, the fact that it is a communications control character is recognized by the logic unit $L_1$. The particular system classification of the communications system present in the system-class register SYST is also recognized by the logic unit $L_1$. A manifestation of the particular communications control character present in register CHAR and a manifestation of the system classification present in register SYST are supplied to an operation-word address generator AG which generates the address of an operation word used to control the channel-coordination message-protection functions called for by the communications control character when present in the data path on its way to or from the particular communications system. The accessing and use of an operation word is accomplished during a cycle of the processor scan unit P when the corresponding line status word is already accessed and available in the several line status word registers.

An operation word is normally needed only when a communications control character appears in the register CHAR. Control characters are used only by communications systems employing message protection procedures. Both the control character itself and the system classification are used to determine the operation word needed. Since differently-coded control characters of different communications systems may call for the same message protection procedure, there can be fewer different operation words than there are different control characters in all systems. Also, when a number of the buffers are connected to similar or identical communications systems, one set of operation words is sufficient for handling all of them. In view of the foregoing considerations, the arrangement for storing and accessing operation words is much more economical than any other arrangement in which channel coordination information is available every time a line status word is accessed.

The operation word address generator AG supplies an appropriate address to the memory address register MAR to cause the addressed operation word stored in memory HSM to be transferred through the memory data register MDR to a character-recognition-bits register CRB and an operation register OP. The operation decoder and logic unit $L_5$ decodes the contents of the operation register OP and selectively enables the accomplishment of channel-coordination message-protection functions by the logic units $L_1$ and $L_2$.

The portion of the operation word transferred to the character-recognition-bits register CRB include bits representing communications control characters as follows: acknowledgment, negative acknowledgment, start of text, end of text, end of transmission block, end of transmission, attention, cancel, inquiry or repeat message, buffer controls, and start special sequence.

The portion of the operation word transferred to the operation register OP includes information concerning operations as follows: interrupt control, action control, sequence modifier, compare with previous character, shift control, block parity control, in data block control, sequence counter control, buffer disconnect terminate control, character store control, set idle line sequence and set status modifier in standard-device-byte register SDB.

*Data transfer terminated by operation word*

A communications control character, such as an "end of message" control character, may cause the accessing of an operation word which requires the termination of operation of a respective buffer. The operation word, accessed during a line status word scan by processor scan unit P, is sensed by the decoder $L_5$ which stores a termination request in the command-and-control register C&C. The contents of register C&C and all other registers is returned to the memory HSM at the end of the scan cycle of processor scan unit P.

During a subsequently-occurring access of the same line staus word by the buffer scan unit B, the command decoder $L_3$ decodes the "terminate request" stored in the command-and-control register C&C and supplies a termination command over line TERC to the selected buffer. The buffer terminates itself and responds (when it has complied and is next selected during a cycle of the buffer scan unit B) with an "end report" signal on line ER. The "end report" signal is stored in the standard-device-byte register SDB and returns to memory HSM at the end of the buffer scan cycle.

The next time that the same line status word is accessed by the processor scan unit P, "service request" and "end" signals are sent on lines SR and END to the computer processor. The computer processor then conditions switch SW for transmission of the address of the accessed line status word (and buffer) from the processor scan unit P through the data input line DIN to the processor. Next, the processor conditions switch SW for transmission of the standard device byte from register SDB over the data input line DIN to the processor. The processor responds to the information thus received by conditioning switch SW and issuing a new command to the communications control unit over the data output line DOUT to the command decoder $L_3$. The new command may be a "read"

command, a "write" command, a "write control" command, or a "set termination interrupt" command.

If the command is a "set termination interrupt" command, the command decoder $L_3$ provides an output which acts through the logic unit $L_2$ to set an "interrupt pending" bit in the standard-device-byte register SDB. Thereafter, during a cycle of interrupt scan unit I accessing the same line status word, the logic unit $L_2$ senses the "interrupt pending" bit in register SDB and sends an "interrupt" signal over line INTPT to the processor. An interrupt procedure is then followed as described above under "Data Transfer Interruption by Processor."

*Communications reporting message procedures*

The operation word accessed when a communications control character is present in character register CHAR may require the sending of a communications reporting message to the computer processor to inform the processor of special conditions requiring action by the processor. The need for a communications reporting message is indicated by certain bits of the accessed operation word stored in operation register OP. These bits when decoded by decoder $L_5$ supply a "communications message required" signal over line CMR to a sequence control unit SCU in the communications reporting logic unit $L_6$. Sequence control unit SCU issues a service request to the processor over line SR and then enables gate $G_5$. The processor enables the transfer of the address of the communications message reporting logic unit $L_6$, permanently stored in address unit $AL_6$, through gate $G_5$, through the address input AI of switch SW and over the data input line DIN to the computer processor. The processor then follows its usual procedure in enabling the switch SW to pass a character from data input line DI of switch SW and over the data input line DIN to the processor. However, in this instance, the character supplied to the processor it not a data character, but rather is the address of the accessed buffer derived from the processor scan unit P and passed through the gate $G_3$ to the data input line DIN. The gate $G_3$ is enabled by a "pass address" signal over line PA from sequence control unit SCU in communications message reporting logic unit $L_6$.

The computer processor, having received an address and a character from the data line DI, treats the information as though it were the address of a communications buffer and a data character received from that buffer. The processor stores the supposed data character in a location of its memory assigned to the communications message reporting logic unit $L_6$. The processor then repeats the standard sequence of receiving a service request (which again is from unit SCU in the communications message reporting logic unit $L_6$), an address (which is the address in unit $AL_6$ of the communications message reporting logic unit $L_6$) and a supposed data character (which is actually a communications reporting byte concerning the communications line corresponding with the presently-accessed line status word).

The communications reporting byte is constituted by the combined contents of the device-reporting-bits register DRB and the character-recognition-bits register CRB. The sequence control unit SCU in communications message reporting logic unit $L_6$ sends a "pass byte" signal over line PB which enables the gate $G_4$ to pass the communications reporting byte from registers DRB and CRB through the switch input line DI and the data input line DIN to the computer processor.

At this point in the description, the computer processor has stored in its memory at a location reserved for the communications message reporting logic unit $L_6$: a buffer address, and a communications reporting byte describing conditions concerning the communications system identified by the buffer address. At this time, the sequence control unit SCU in communications message reporting logic unit $L_6$ sets an internal interrupt lead INTL to be sensed at a later time in alerting the computer processor to the fact that it has an interrupt condition (a communications reporting message) to deal with. The existing cycle of the processor scan unit P is then terminated by the return of the line status word and the operation word to their assigned locations in memory HSM.

Following every cycle of the processor scan unit P, and prior to the next normal cycle of the interrupt scan unit I, the sequencer SEQ always sends a "sense interrupt" signal over line SI to a gate $G_6$ at the output of interrupt lead INTL in the communications message reporting logic unit $L_6$. If the interrupt lead INTL is set, an "interrupt" signal is passed by gate $G_6$ over control line INTPT to the computer processor. The interrupt signal also is directed to switches $S_1$ and $S_2$ to change their positions from the normal positions shown in the drawing. The computer processor responds to the interrupt on line INTPT by transmitting a command "who are you?" over the data output line DOUT to the command decoder $L_3$. The output WRU of decoder $L_3$ is directed through switch $S_1$ to the command unit CU in the communications message reporting logic unit $L_6$. The command unit CU enables gate $G_5$ to transfer the permanently-stored address of logic unit $L_6$ in unit $AL_6$ over the data input line DIN to the computer processor.

The command unit CU in communications message reporting logic unit $L_6$ then transmits a "ready" signal to the computer processor over line READY which, as is usual, stimulates the processor to send a "send status" command over data output line DOUT to the command decoder $L_3$. The "send status" output from decoder $L_3$ passes over line SS and through switch $S_2$ to the command unit CU in communications message reporting logic unit $L_6$. The command unit CU then enables gate $G_7$ to pass the contents of the local standard-device-byte register $SDB_2$ of logic unit $L_6$ over data input line DIN to the computer processor. The computer processor is thus alerted and informed that it has a communications message report stored in its memory which requires it to enter a routine designed to perform necessary channel-coordination message-protection functions.

What is claimed is:

1. In a communications control unit for controlling the interchange of data between a computer processor and many line buffers of a number of respective communications systems at least one of which utilizes message protection control characters, a unit of data interchanged with said computer processor being preceded by an address identifying the respective communications line, said computer processor being conditioned to handle an additional distinctive address designated a communications reporting address, the combination of memory means for the storage of as many line status words as there are communications lines, each line status word having an address corresponding with the address of the corresponding communication line, line scanner means to sequentially access the line status words in said memory and enable interchange with a respective line buffer and enable interchange with the computer processor, means responsive to the presence of a message-protection control character in an accessed line status word to generate an appropriate communications reporting byte, and a communications reporting logic unit operative to transfer to the computer processor said communications reporting address, the address of the accessed line status word, and said communications reporting byte, whereby complex communications control information can be conveyed to the computer processor through a standard interface trunk such as is used between the computer processor and all other peripheral equipments.

2. A communications control unit for controlling the interchange of data between a computer processor and many line buffers of a number of respective communications systems at least one of which utilizes control characters, a unit of data interchanged with said computer processor being preceded by an address identifying the respective communications line, said computer processor being conditioned to handle an additional distinctive address designated a communications reporting address, comprising memory means for the storage of line status words having the addresses of corresponding communications lines, and for the storage of operation words, line scanner means to sequentially access the line status words in said memory and enable interchange with a respective line buffer and with the computer processor, operation word address generating means responsive to the presence in the accessed line status word of a control character and operative to access a particular corresponding operation word in said memory, and a communications reporting logic unit responsive to said accessed operation word and operative to transfer to the computer processor said communications reporting address, the address of the accessed line status word, and a portion of said accessed operation word.

3. A communications control unit for controlling the interchange of data between a computer processor and many line buffers of a number of respective communications systems at least one of which is of a class of systems utilizing message-protection control characters, a unit of data interchanged with said computer processor being preceded by an address identifying the respective communications line, said computer processor being conditioned to handle an additional distinctive address designated a communications reporting address, comprising memory means for the storage of line status words having the addresses of corresponding communications lines, each line status word including a character portion, a system-class portion, and a status-and-control portion, and for the storage of as many operation words as there are different sets of control functions to be performed in response to control characters, line scanner means to sequentially access the line status words in said memory and enable interchange with a respective line buffer and with the computer processor, operation word address generating means responsive to the presence in the character and system-class portions of an accessed line status word of a control character and the designation of a system class utilizing that control character, and operative to access a particular corresponding operation word in said memory, and a communications reporting logic unit responsive to an accessed operation word to transfer to the computer processor said communications reporting address, the address of the accessed line status word, and portions of the accessed line status word and the accessed operation word.

4. A communications control unit for controlling the interchange of data between a computer processor and many line buffers of a number of respective communications systems at least one of which is of a class of systems utilizing message-protection control characters, a unit of data interchanged with said computer processor being preceded by an address identifying the respective communications line, said computer processor being conditioned to handle an additional distinctive address designated a communications reporting address, comprising memory means for the storage of line status words having the addresses of corresponding communications lines, each line status word including a character portion, a system-class portion, and a status-and-control portion, and for the storage of as many operation words as there are different sets of control functions to be performed in response to control characters, line scanner means to sequentially access the line status words in said memory and enable interchange with a respective line buffer and with the computer processor, operation word address generating means responsive to the presence in the character and system-class portions of an accessed line status word of a control character and the designation of a system class utilizing that control character, and operative to access a particular corresponding operation word in said memory, decoder means to decode the accessed operation word and condition conductive paths for the performance of the message-protection functions required by the particular control character when present in a system of the particular communications system class, and a communications reporting logic unit responsive to said decoder means to transfer to the computer processor said communications reporting address, the address of the accessed line status word, and portions of the accessed line status word and the accessed operation word.

References Cited

UNITED STATES PATENTS

| | | | |
|---|---|---|---|
| 3,293,612 | 12/1966 | Ling | 340—172.5 |
| 3,297,996 | 1/1967 | Grady | 340—172.5 |
| 3,303,476 | 2/1967 | Moyer et al. | 340—172.5 |
| 3,305,839 | 2/1967 | Looschen et al. | 340—172.5 |
| 3,312,945 | 4/1967 | Berezin et al. | 340—172.5 |

PAUL J. HENON, *Primary Examiner.*

I. S. KAVRUKOV, *Assistant Examiner.*